United States Patent
Long et al.

(10) Patent No.: US 6,778,488 B1
(45) Date of Patent: Aug. 17, 2004

(54) MATRIX RECOVERY SYSTEM AND METHOD IN A TELECOMMUNICATIONS NODE

(75) Inventors: William L. Long, Garland, TX (US); Richard G. Van Tyne, Jr., Pilot Point, TX (US); William L. Brazell, Garland, TX (US); Jose Salmones, Plano, TX (US); Donald Loewen, Dallas, TX (US); Johnny Wheat, Allen, TX (US); Val Teodorescu, Plano, TX (US)

(73) Assignee: Alcatel, Paris (FR)

( * ) Notice: Subject to any disclaimer, the term of this patent is extended or adjusted under 35 U.S.C. 154(b) by 698 days.

(21) Appl. No.: 09/588,194

(22) Filed: Jun. 6, 2000

(51) Int. Cl.[7] .............................................. H04L 12/16
(52) U.S. Cl. ...................................... 370/216; 370/220
(58) Field of Search ................................ 370/216, 219, 370/220, 225, 227, 228; 379/22.03, 26.01

(56) References Cited

U.S. PATENT DOCUMENTS

| | | | | |
|---|---|---|---|---|
| 4,366,350 A | * | 12/1982 | Lee et al. ................. | 379/29.07 |
| 4,829,554 A | * | 5/1989 | Barnes et al. ............. | 455/432.1 |
| 5,218,602 A | * | 6/1993 | Grant et al. .................. | 370/390 |
| 5,923,643 A | * | 7/1999 | Higgins et al. .............. | 370/218 |

* cited by examiner

*Primary Examiner*—Alpus H. Hsu
*Assistant Examiner*—Toan Nguyen
(74) *Attorney, Agent, or Firm*—Danamraj & Youst, P.C.; Craig A. Hoersten; V. Lawrence Sewell

(57) ABSTRACT

Matrix recovery and link maintenance for a signaling node in an SS7 network. The signaling node comprises a planar redundant switching matrix with master and standby sides. End devices for trunk interfacing and channel data control receive data and timing from the master side, de-coupled from data and timing paths of the standby side. In steady-state, revenue traffic between the SS7 network and the signaling node runs on the master side in a pulse code modulated (PCM) form. Test channels are set up on both sides. Test patterns are propagated on the test channels for monitoring failures of timing path, PCM data, and device communication. When a failure condition is detected on the master side, the signaling node transmits idle signaling to the network, so that the revenue traffic is suspended and the link is maintained in an in-service state.

16 Claims, 14 Drawing Sheets

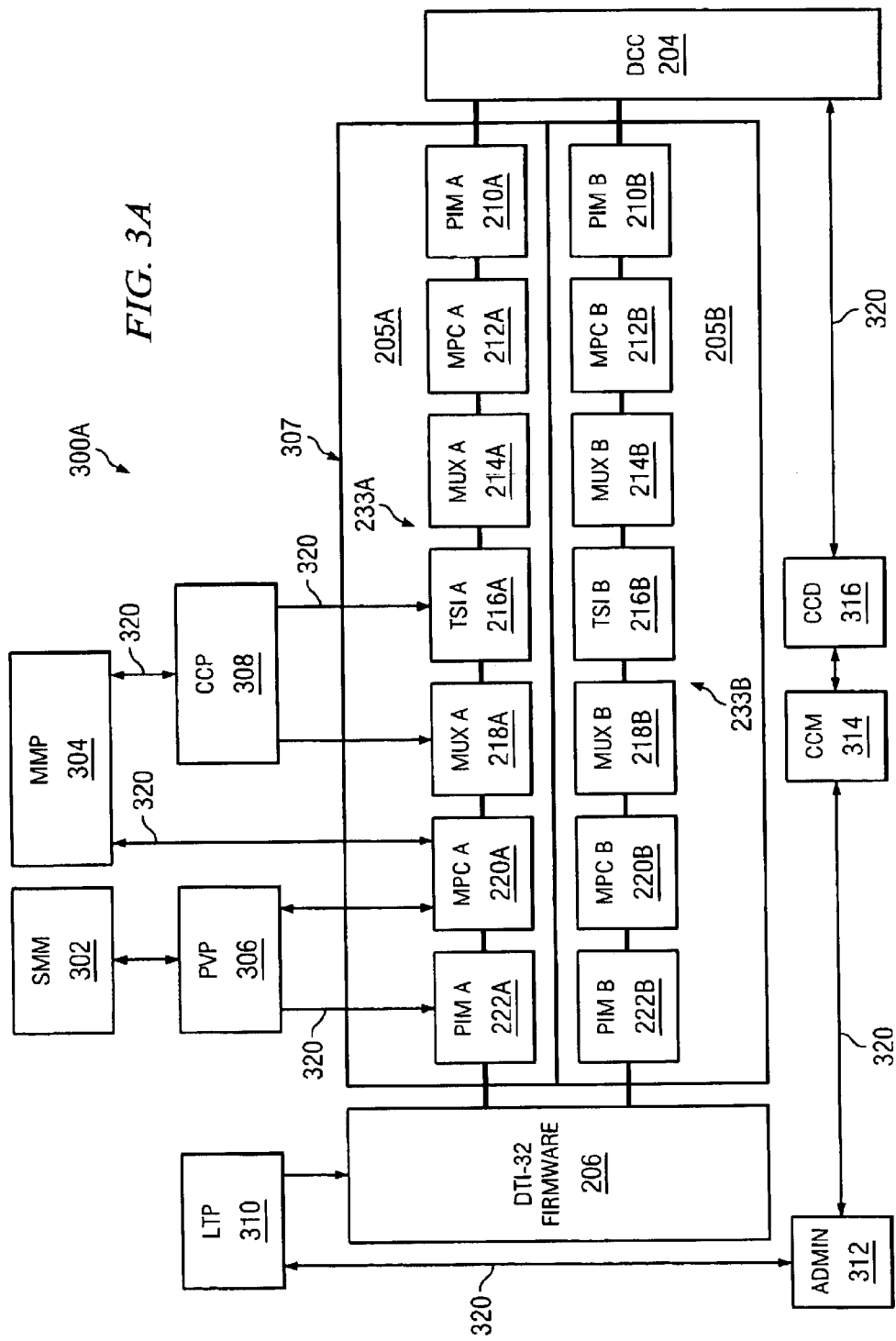

MATRIX RECOVERY SYSTEM AND METHOD IN A TELECOMMUNICATIONS NODE

BACKGROUND OF THE INVENTION

1. Technical Field of the Invention

The present invention relates to telecommunications equipment and, more particularly, to a system and method for recovering a communications node with a redundant matrix architecture upon detecting a failure before the network (e.g., a Signaling System No. 7 (SS7) network) in which the node is disposed attempts to take down the communications link between the node and the network.

2. Description of Related Art

Out-of-band signaling establishes a separate channel for the exchange of signaling information between call component nodes in order to set up, maintain and service a call in a telephony network. Such channels, called signaling links, are used to carry all the necessary signaling messages between the nodes. Thus, for example, when a call is placed, the dialed digits, trunk selected, and other pertinent information are sent between network switches using their signaling links, rather than the trunks which will ultimately carry the bearer traffic, i.e., conversation.

Out-of-band signaling has several advantages that make it more desirable than traditional in-band signaling. First, it allows for the transport of more data at higher speeds than multi-frequency (MF) outpulsing used in the telephony networks without SS7. Also, because of separate trunks and links, signaling can be done at any time in the entire duration of the call, not just at the beginning. Furthermore, out-of-band signaling enables signaling to network elements to which there is no direct trunk connection.

SS7 packet signaling has become the out-of-band signaling scheme of choice between telephony networks and between network elements worldwide. Three essential components are defined in a signaling network based on SS7 architecture. Signal Switching Points (SSPs) are basically telephone switches equipped with SS7-capable software that terminate signaling links. SSPs generally originate, terminate, or switch calls. Signal Transfer Points (STPs) are the packet switches of the SS7 network. In addition to certain specialized functions, they receive and route incoming signaling messages towards their proper destination. Finally, Signal Control Points (SCPs) are databases that provide information necessary for advanced call-processing and Service Logic execution.

As is well known, SS7 signaling architecture is governed by several multi-layered protocols standardized under the American National Standards Institute (ANSI) and the International Telecommunications Union (ITU) to operate as the common "glue" that binds the ubiquitous autonomous networks together so as to provide a "one network" feel that telephone subscribers have come to expect.

The exponential increase in the number of local telephone lines, mobile subscribers, pages, fax machines, and other data devices, e.g., computers, Information Appliances, etc., coupled with deregulation that is occurring worldwide today is driving demand for small form factor, high capacity STPs which must be easy to maintain, provide full SS7 functionality with so-called "five nines" operational availability (i.e., 99.999% uptime), and provide the capability to support future functionality or features as the need arises. Further, as the subscriber demand for more service options proliferates, an evolution is taking place to integrate Intelligent Network (IN)-capable SCP functionality within STP nodes.

Those skilled in the art should readily recognize that several difficulties must be overcome in order to integrate the requisite functionalities into a suitable network element that satisfies the stringent performance criteria, e.g., high degree of operational availability, required of telecommunications equipment. Challenges arise in designing a compact enough form factor that is efficiently scalable, ruggedized, and modularized for easy maintenance, yet must house complex electronic circuitry, e.g., processors, control components, timing modules, I/O, line interface cards which couple to telephony networks, that is typically required for achieving the necessary network element functionality. In addition, such complexity in the equipment increases the probability of various single point failures that cause downtime. These failures can be caused by a variety of errors in timing and data paths (e.g., framing errors, loss of signal, loss of alignment, etc.), mechanical problems, electronic component and board failures, and loss of device communication, e.g., cabling problems.

It is well known that redundant architectures are utilized in designing telecommunications equipment in order to minimize the risk of such failures as described hereinabove. Most, if not all, of the switching hardware of a network element (i.e., a telecommunications node) is provided in a duplexed or redundant matrix configuration wherein the devices (and the data and timing paths effectuated thereby) are organized into two planes or sides which are mirror images of each other. One of the planes operates as the master plane that carries valid data and timing for the node, whereas the other plane is provided as a standby. Consequently, when a failure is encountered on the master side during the operation of the equipment, the standby side becomes active and the matrix accordingly switches to that side.

Although advances such as redundancy are effective in increasing network element availability, current solutions for providing redundancy in telecommunications equipment are beset with several deficiencies and shortcomings. For example, one of the more serious consequences of the existing redundancy architectures which are provided as cross-coupled matrix planes is that the time for detecting a failure and effectuating a switchover accordingly is too long compared to the reaction time of the network. For instance, the reaction time for SS7 networks to fail a link is between 48 and 128 milliseconds (depending on the data patterns received). Accordingly, if the failure detection and switchover are not completed by the node within that time window, the SS7 link between the node and the network will be taken down by the network (i.e., the switch provided on the other side of the link).

SUMMARY OF THE INVENTION

Accordingly, the present invention is directed in one aspect to a communications node disposed in a telecommunications network that maintains its communications link by rapidly switching planes before the link is taken down by the network when a failure is encountered in the node. The communications node comprises a redundant matrix that is organized in a planar mode having a first side and a second side, wherein data and timing paths of the first side are de-coupled from the data and timing paths of the second side. There is at least one trunk-interfacing end device for interfacing with the telecommunications network via a communications link. The trunk-interfacing end devices are coupled to the redundant matrix at a first terminus. At a second terminus, one or more channel-controller end devices are coupled to the redundant matrix. That is, the trunk-interfacing end devices (circuits/channels) and channel-controller end devices (channels/circuits/links) are connected to each other through the redundant matrix. The communications node is provided with a plurality of end-to-end test channels used for monitoring a failure condition associated with the redundant matrix. Hardware, firmware, and software modules are provided for switching the operation of the communications node from the active side to the standby side when a failure is detected in the active side, the switchover being effectuated within a time window that permits continued maintenance of the link.

In another aspect, the present invention relates to a link maintenance method for use in a communications node disposed in a telecommunications network, wherein the communications node is organized as a de-coupled redundant matrix having a first side and a second side. The communications node is placed and operated in a planar mode such that revenue traffic between the communications node and the telecommunications network traverses either the first side or the second side of the redundant matrix. The side carrying the revenue traffic is designated as the master side, the other side being the standby side. In the planar mode of operation, the data and timing paths of the first side are completely de-coupled from the data and timing paths of the second side such that single point failures are easily isolated in the matrix to one side or the other. The master side of the redundant switching matrix is monitored for a failure condition associated therewith by employing a plurality of test channels in the redundant matrix. At least one predetermined or fixed test pattern is preferably continuously propagated on the dedicated (i.e., "nailed up") test channels for detecting any variances therein by monitors enabled in the trunk-interfacing end devices of the node. The operation of the communications node is switched from the side with a failure to the other side with good timing and data, provided auto-switchover is enabled. Preferably, auto-switchover is enabled when all the matrix devices of both matrix planes are in-service, i.e., capable of handling SS7 traffic. In a presently preferred exemplary embodiment, when a failure condition is detected, the communications node injects appropriate idle codes towards the network such that the link is placed in a "hold" mode. The link is thereby prevented from being taken down by the network. Upon the switchover, the idle codes are turned off so that the link is operational for transporting signal traffic again.

In yet further aspect, the present invention is directed to a signaling node (e.g., an STP) disposed in a Signaling System No. 7 (SS7) network for switching between a plurality of SS7 links. The signaling node comprises a planar redundant matrix with a master side and a standby side wherein revenue traffic between the signaling node and the SS7 network runs on the master side encoded in pulse code modulation (PCM) form. In the planar mode of operation, data and timing paths of the master s de are de-coupled from the data and timing paths of the standby side. A plurality of Digital Trunk Interface (DTI) devices are disposed on a first terminus of the planar redundant matrix for interfacing with the SS7 network, wherein each DTI device supports two E1 spans (each with 30 revenue channels and two test channels). A plurality of bus terminator devices (BTDs) are coupled to the DTI devices for providing appropriate timing for the DTI devices. Preferably, one BTD device is capable of serving up to six DTI devices. A plurality of DS1 Channel Controller (DCC) devices are disposed on a second terminus of the planar redundant matrix for managing appropriate protocol conversion between the PCM revenue traffic and SS7 messages. Firmware monitors are provided in the DTI devices that detect failure conditions in the master side by monitoring for variance(s) in fixed test patterns injected into matrix test channel connections. Preferably, errors in PCM data, timing, and errors relating to device communication are detected by the firmware monitors when a test pattern variance is observed. Hardware, firmware, and software components are provided in a distributed architecture in the node for switching the data/timing paths for the DTI and DCC devices from the master side to the standby side of the planar matrix when a failure condition is encountered in the master side.

BRIEF DESCRIPTION OF THE DRAWINGS

A more complete understanding of the present invention may be had by reference to the following Detailed Description when taken in conjunction with the accompanying drawings wherein:

FIG. 3A depicts a functional block diagram of a presently preferred exemplary STP node wherein de-coupled end-to-end data paths are illustrated in a planar redundant matrix provided in accordance with the teachings of the present invention;

DETAILED DESCRIPTION OF THE DRAWINGS

Figure 1:
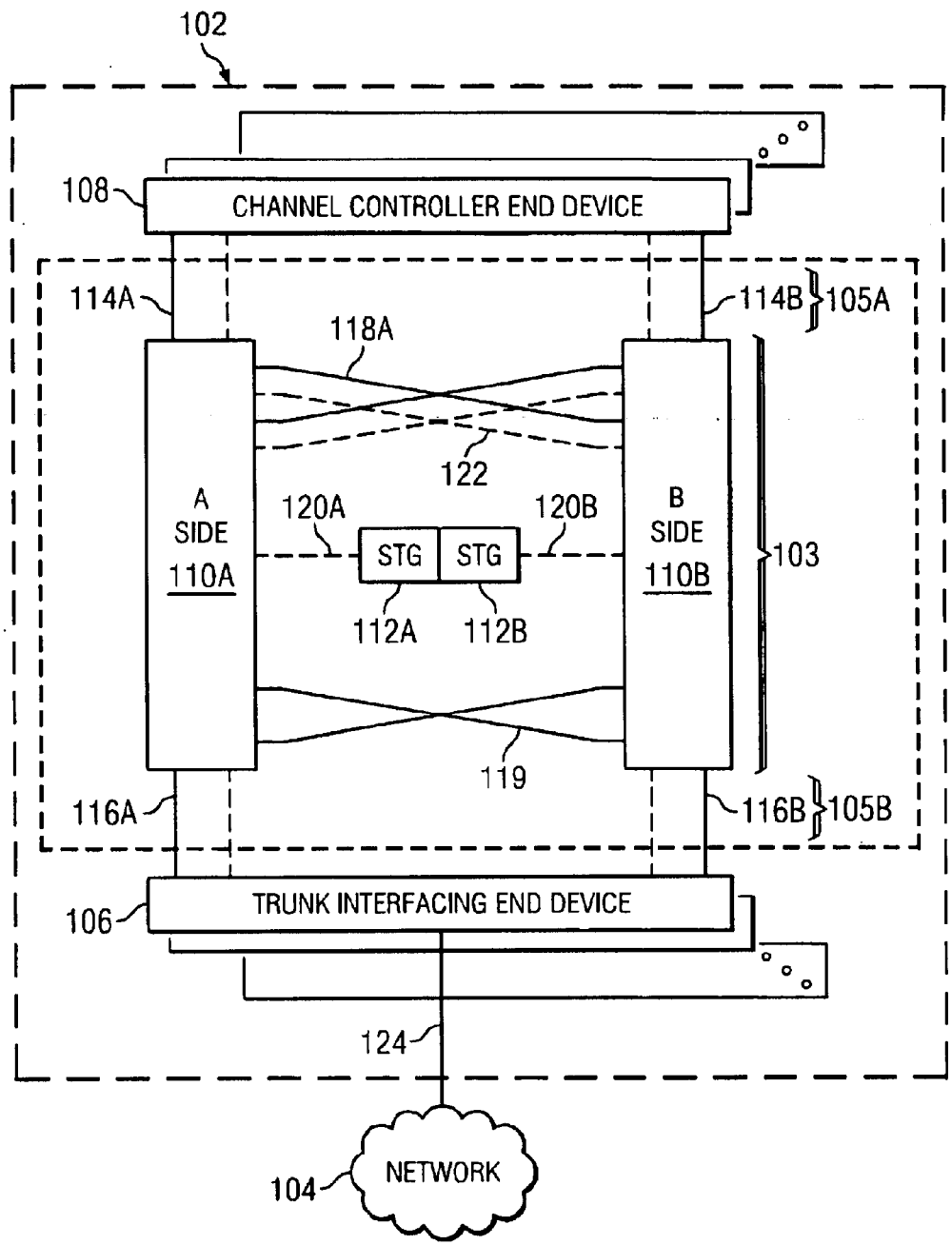
FIG. 1 (Prior Art) depicts a high-level architectural view of a conventional communications node with a cross-coupled redundant switching matrix.

In the drawings, like or similar elements are designated with identical reference numerals throughout the several views thereof, and the various elements depicted are not necessarily drawn to scale. Referring now to FIG. 1, depicted therein is a high-level architectural view of a conventional communications node 102 (e.g., a Signal Transfer Point (STP )) coupled to a network environment 104 via at least one communication link (e.g., link 124). The conventional STP node 102 is provided with a redundant switching matrix 103 having a first matrix side or plane 110A and a second matrix side or plane 110B, wherein data paths of the matrix planes are cross-coupled at one or more data cross-coupling points. For example, two such data cross-coupling points, reference numerals 118 and 119, are illustrated in this FIG. Timing is provided in the communications node 102 by means of suitable redundant system timing generators (denoted as STGs or STGEs), reference numerals 112A and 112B, wherein timing paths 120A and 120B for the matrix planes 110A and 110B, respectively, are illustrated by means of a broken line. The timing paths for the two matrix sides or planes are also cross-coupled at at least one timing cross-coupling point, e.g, reference numeral 122.

It should be recognized by those skilled in the art that the switching matrix 103 is logically a collection of numerous paths that can be switched between a large number of end devices connected to the matrix. Two end devices between which a switched path is set up may accordingly be thought of as being disposed at two termini of the switched path. Correspondingly, for purposes of the present invention, the switched matrix 103 may be deemed to be comprised of two termini—one where the trunk-interfacing end devices are disposed and the other where the channel controller end devices are disposed.

Accordingly, a plurality of trunk interfacing end devices (e.g., end device 106) are coupled to a terminus 105B of the switching matrix 103 by means of redundant/duplexed data paths or "highways" (reference numerals 116A and 116B) from the matrix planes 110A and 110B, respectively. The trunk interfacing end device 106 interfaces with the network 104 via the communication link 104 and may use the data and timing paths emanating from either of the matrix planes.

A plurality of channel controller end devices (e.g., end device 108) are coupled to the other terminus 105A of the redundant switching matrix 103 via redundant/duplexed data paths 114A and 114B emanating from the matrix planes 110A and 110B, respectively. Typically, the channel controller end devices are responsible for providing appropriate protocol conversion between the signaling data or messages operable with the network 104 and the revenue traffic within the communications node which is conventionally provided in pulse code modulated (PCM) form. Analogous to the trunk interfacing end devices disposed on the other terminus of the switching matrix 103, the channel controller end devices use the data and timing paths of either matrix side.

Figure 2A:
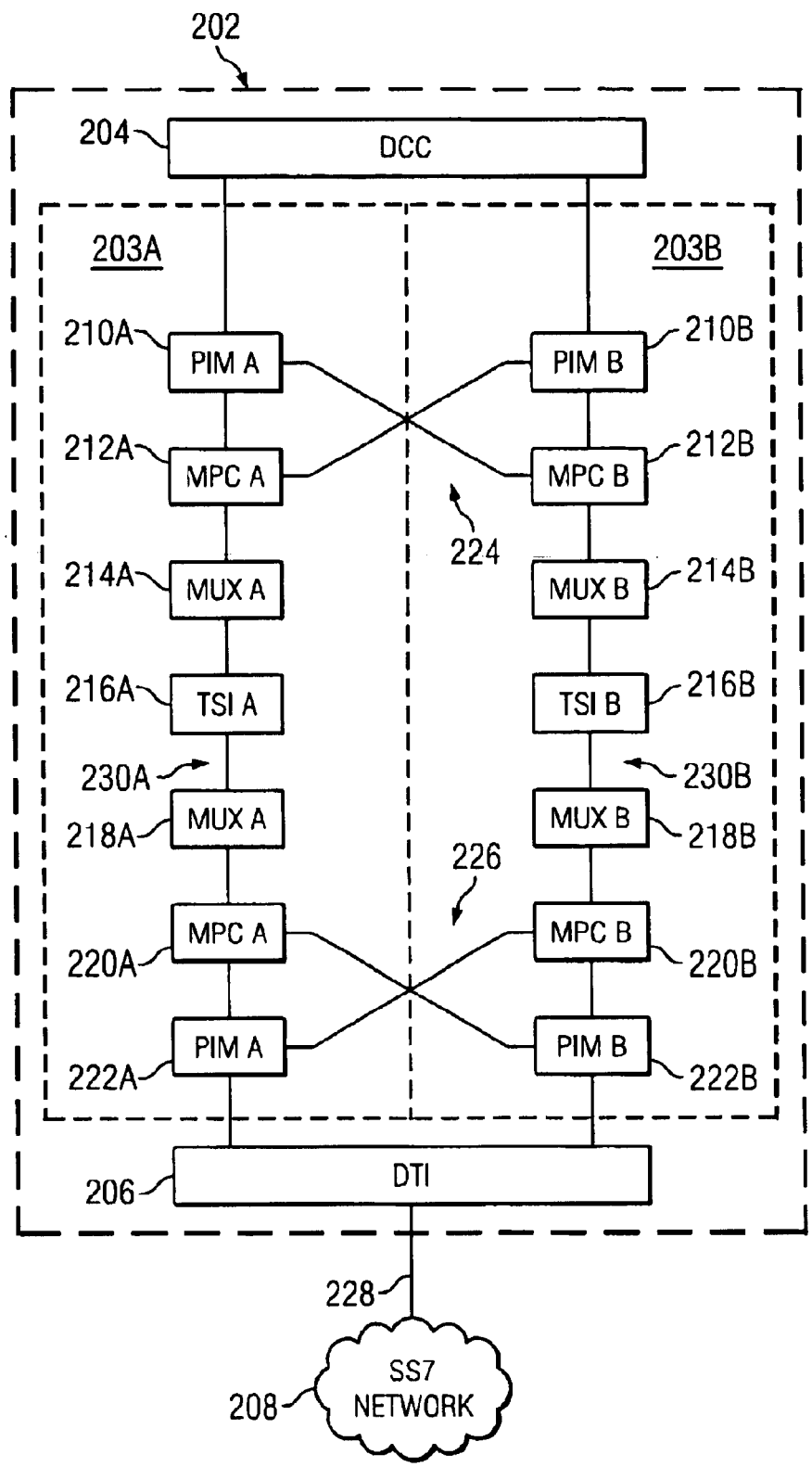
FIG. 2A (Prior Art) depicts a functional block diagram of a conventional Signal Transfer Point (STP) coupled to an E1 network, wherein end-to-end data paths of the STP are cross-coupled in the redundant switching matrix.

Referring now to FIG. 2A, shown therein is a functional block diagram of a conventional STP node 202 that is coupled to an SS7 network 208 via a communication link 228 operating at an E1 transmission rate, wherein end-to-end data paths (reference numerals 230A and 230B) of the two matrix planes are provided in the cross-coupled form. The E1 system is the European counterpart to the T1 high-speed communications system used in North America. While they are essentially similar in many general aspects, there are differences as to details such as speed of transmissions, number of channels, and the lack of bit-robbing. E1 transmits at 2.048 Megabits per second (Mbps) (compared to 1.544 Mbps in T1 systems) using time division multiplexing (TDM) and PCM simultaneously on up to 3064-Kbps DS1 channels. Two additional channels are used for signaling and framing.

One or more Digital Trunk Interface (DTI) cards (reference numeral 206) optimized for the 32-circuit E1 transmission link or links (reference numeral 228) are provided as the trunk end devices of the STP node 202. In similar fashion, DS1 Channel Controller (DCC) cards (e.g., reference numeral 204) are provided in the STP node 202 at the other terminus of the redundant switching matrix of the conventional STP node 202.

The end-to-end data path 230A of the switching matrix plane 203A provided between the DTI card 206 and the DCC card 204 typically traverses the following redundant devices in the matrix. Starting at the DCC end, the data path highway associated with the DCC card 204 is operably connected to a Path Integrity Monitor (PIM) device 210A that is coupled to a Matrix Port Controller (MPC) 212A. A multiplexer (MUX) 214A is coupled to the MPC 212A. A Time Slot Interchange (TSI) processor device 216A is coupled via the data path 230A to the MUX 214A. A separate MUX (e.g., MUX 218A) or the MUX 214A may be used for coupling the TSI processor 216A to another MPC 220A that is connected to a PIM 222A serving the DTI card(s) 206. Also, although separate MPC and PIM devices (e.g., MPC 212A and MPC 220, PIM 210A and PIM 222A) are shown in the data path 230A, a single MPC or PIM device may be provided for both inbound and outbound data flows.

The end-to-end data path 230B of the switching matrix plane 203 B is similarly disposed among a plurality of devices that are provided as redundant/duplexed devices with respect to the devices in the matrix plane 203A. Accordingly, the end-to-end data path 230B also traverses the same devices as described hereinabove, but disposed on the redundant side of the matrix.

Continuing to refer to FIG. 2A, the conventional STP node 202 includes two data cross-coupling points 224 and 226. As shown at reference numeral 224, the PIM 210A is cross-coupled to the MPC 212B provided on the redundant matrix side 203B via the data path 230B and the PIM 210B is cross-coupled to the MPC 212A provided on the matrix side 203A via the data path 230A. Similarly, at reference numeral 226, the PIM 222B is cross-coupled to the MPC 220A via the data path 230A and PIM 222A is cross-coupled to the MPC 220B provided on the redundant matrix side 203B via the data path 230B. The end devices (e.g., DTI and DCC cards) may utilize data paths from either of the matrix planes on a card-by-card basis depending upon the timing path provided thereto. Also, the PIMs can choose or switch sides within the matrix. That is, even though a DTI chooses an A-side connection, it can still get B-side data because of cross-connections within the redundant matrix.

Figure 2B:
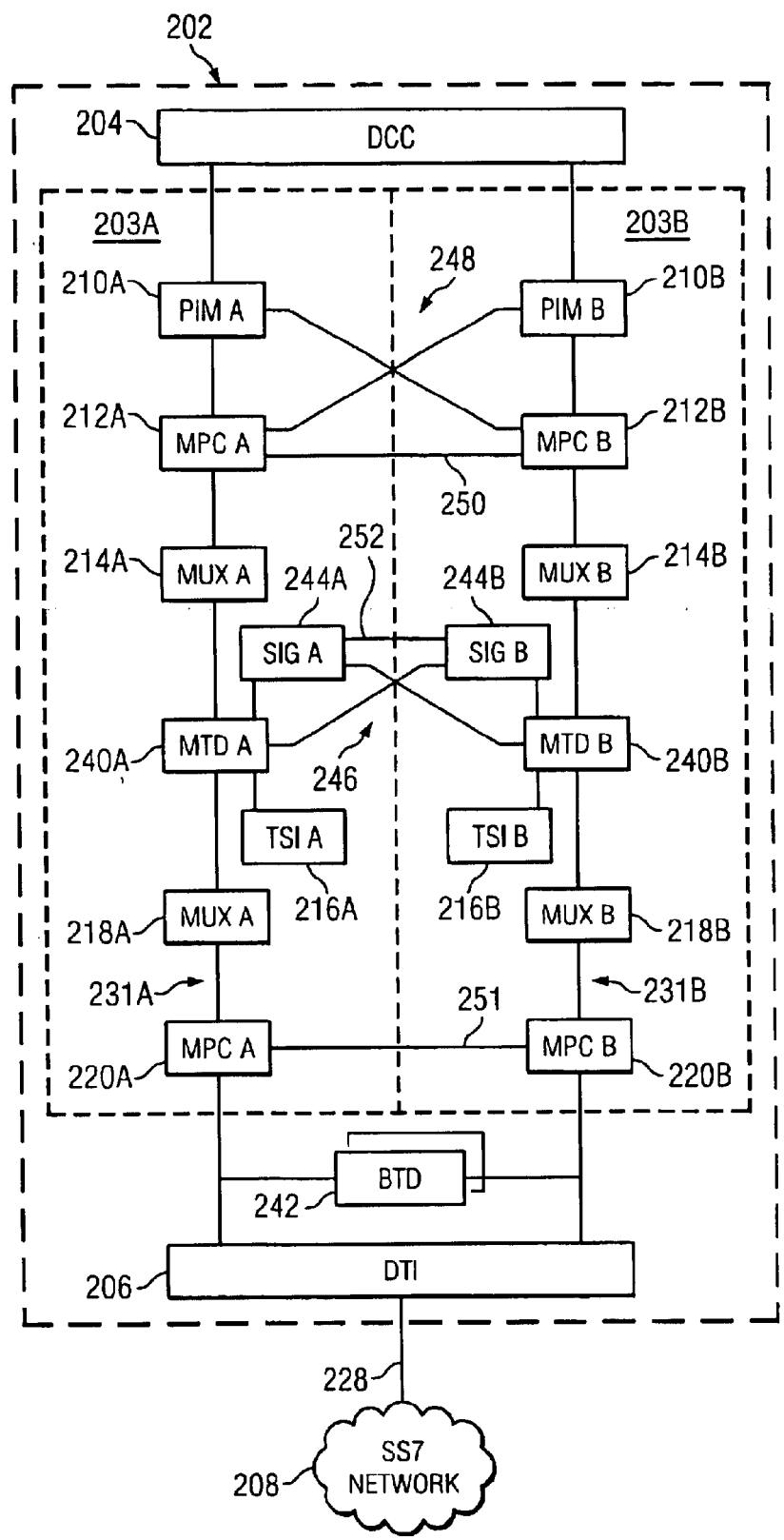
FIG. 2B (Prior Art) depicts a functional block diagram of the conventional STP wherein cross-coupled timing paths of the STP are illustrated.

FIG. 2B depicts a functional block diagram of the conventional STP node 202 which includes cross-coupled timing paths provided in redundant or duplex form. A redundant pair of STGs 244A and 244B are disposed in the STP node 202 for providing system timing paths 231A and 231B to the switching planes 203A and 203B, respectively. The redundant timing paths are provided as follows—one from the STGs towards the DTI cards and one from the STGs towards the DCC cards. The timing paths traverse a Matrix Timing Distributor (MTD) (reference numerals 240A and 240B) on each matrix plane before they are propagated to the DTI and DCC cards. Whereas the STG-DCC timing path portion involves the PIMs, the STG-DTI timing path portions do not go through the PIMs associated with the DTI cards. Rather, the timing is provided to one or more Bus Terminator Devices (BTDs) (e.g., BTD 242) which control the timing plane provided to the DTI cards 206. The timing paths 231A and 231B are conventionally cross-coupled at two timing path cross-coupling points. At reference numeral 246, the timing path from the STG 244A is cross-coupled to the MTD 240B of the matrix plane 203B. Also, the timing path from the STG 244B is cross-coupled thereat to the MTD 240A of the matrix plane 203A. In similar fashion, the timing paths between MPCs and PIMs are cross-coupled at reference numeral 248. Additionally, the timing paths are framelocked between the active and mate oscillators at the STG level via mate synchronization path 252 and at the MPC level via mate synchronization paths 250 and 251.

Because of the cross-coupling of the redundant data and timing paths provided in the conventional STP node 202, the end devices may "see" the PCM data and timing from both sides of the matrix on a per channel basis because the receiving PIMs can select PCM from either MPC. Further, if a matrix device on one side fails for whatever reason, it affects the timing or PCM of the other side because of the cross-coupled data and timing paths. Accordingly, it should be appreciated by those skilled in the art that isolation of failures in the conventional communications nodes is rather cumbersome and tedious, which increases the time for failure detection and effecting a switchover in the redundant matrix. As set forth hereinabove in the Background of the present patent application, the risk of taking down the communication link by the network in the event of a failure also increases correspondingly in the conventional STP nodes.

Referring now to FIG. 3A, depicted therein is functional block diagram of a presently preferred exemplary STP node 300A wherein a planar redundant matrix 307 is provided in accordance with the teachings of the present invention such that end-to-end data paths 233A and 233B are de-coupled. The matrix sides 205A and 205B are preferably provided to include essentially the same devices in a redundant architecture as described hereinabove, the data paths 233A and 233B are completely independent from each other. A plurality of loosely coupled computing/control elements or processing elements are provided in a distributed hardware/firmware/software architecture for controlling the data and timing paths of the de-coupled redundant matrix planes 205A and 205B of the node 300A. It should be realized that multiple instances of the same type of processor/control element may be provided in the architecture based on the capacity and complexity of the node (i.e., the number of links supported by the node); however, only single instances are exemplified in this FIG. for the sake of clarity.

Figure 3B:
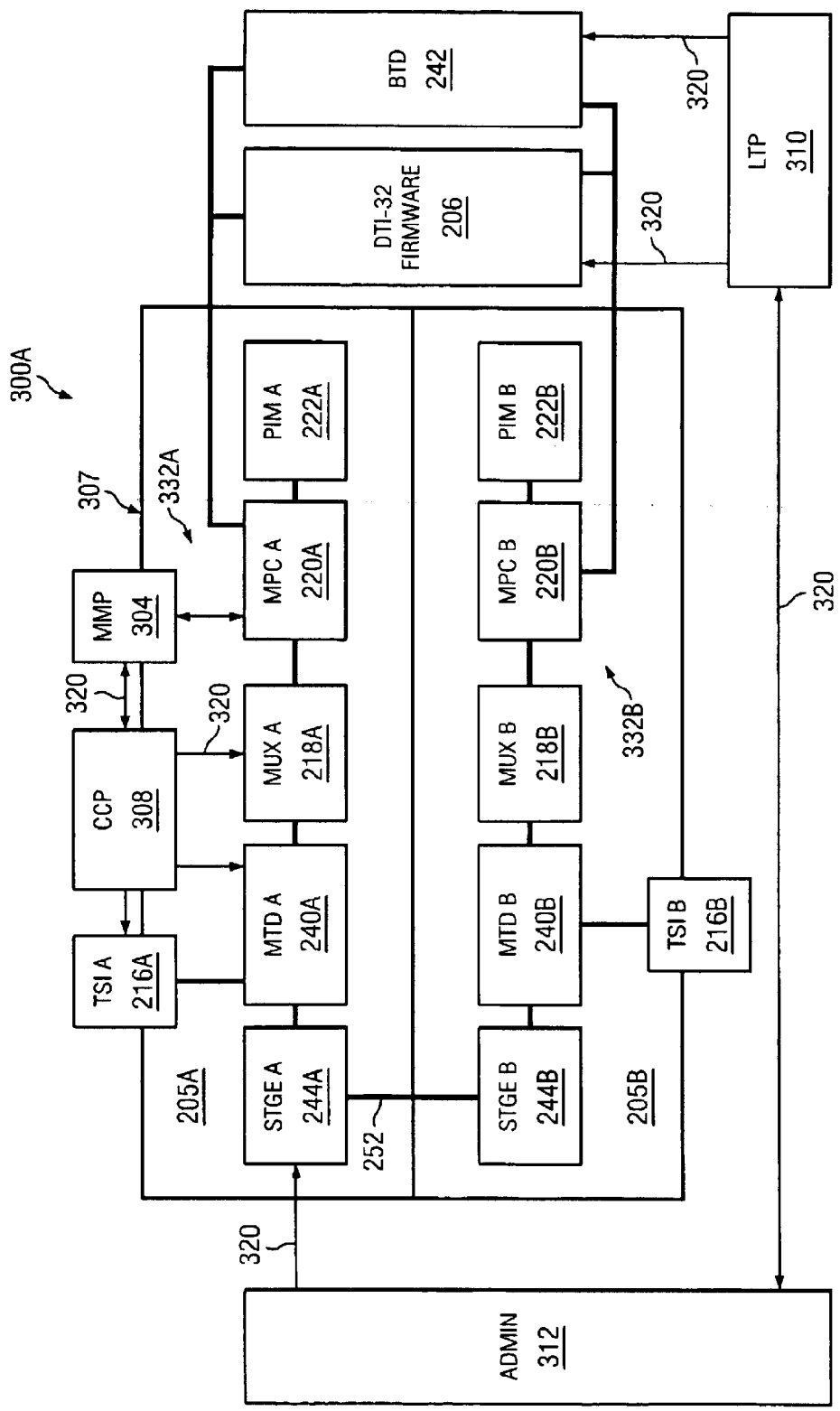
FIGS. 3B and 3C depict functional block diagrams of the presently preferred exemplary STP node wherein de-coupled timing paths are provided in the planar redundant matrix of the present invention.

Continuing to refer to FIG. 3A, a line trunk processor (LTP) 310 controls the DTI's PCM. As will be seen hereinbelow in reference to FIG. 3B, it also controls the BTD timing. A path verification processor (PVP) 306 runs matrix call processing primitive handling software which is responsible for setting up permanent test channel connections used in monitoring the planes as will be seen hereinbelow. A switch matrix manager (SMM) 302 is provided for controlling the operation of the PVP 306. A matrix maintenance processor (MMP) 304 and associated software is responsible for the following functionality: (i) matrix configuration; (ii) fault isolation and device recovery; (iii) matrix testing; and (iv) support of planar mode of operation of the node 300A and switchover. A connection controller processor (CCP) 308 controls timing for various matrix devices and PCM paths of the matrix planes. The CCP 308 also maintains a matrix call processing connection database used in setting up the test channels.

The overall functionality of the matrix software thus encompasses the following:

matrix call processing primitive handling;
matrix configuration;
fault isolation and device recovery;
matrix testing;
support of planar mode of operation of the node 300A;
control of timing for various matrix devices;
control of PCM paths of the matrix planes;
maintenance of a matrix call processing connection database used in setting up revenue connections and test channel connections.

Software/firmware running on the DCC cards 204 controls the DCCs'PCM and timing. A common channel distribution (CCD) processor 316 provides message concentration to the DCCs. A common channel manager (CCM) processor 314 in turn manages message concentration for the CCDs. An administrator (ADMN) 312 is provided for controlling the CCMs and LTPs, in addition to managing the timing path components.

A plurality of control paths, e.g., reference numeral 320, are provided among the various processing elements described hereinabove in order to effectuate the functionality of the redundant matrix—to make connections between channels (circuits) connected to it via end devices.

As seen in the foregoing, the end devices are connected to the matrix via PIMs. For supporting a large number of channels (potentially up to 120,000 circuits), the matrix comprises multiple devices and multiple types of devices to achieve compression and allow switching between all channels. Preferably, any-to-any connectivity is provided, i.e, any channel can be connected to any other channel (including itself) through the matrix.

Structurally, each matrix device may be described as follows in a presently preferred exemplary embodiment:

A PIM supports 672 PCM data channels (640 revenue channels plus 32 test channels, i.e., one test highway).

An MPC supports 2048 PCM data (inbound and outbound) channels.

A MUX supports 8192 PCM data (inbound and outbound) channels.

A TSI supports 32,768 input PCM data channels and switches these to 32,768 output PCM data channels.

An MTD provides timing from either STG to one side of the matrix.

The hardware architecture of the DCC-to-DTI data path (i.e., PCM path) is as follows from the DCC end device to the DTI end device on either A-side (i.e, matrix plane 205A) or B-side (i.e, matrix plane 205A):

DCC sends SS7 link PCM commands towards the DTI-32, i.e., towards the network (not shown in this FIG.);

Inbound PIM is coupled to the DCC via a PCM/timing cable;

Inbound MPC gets the PCM data from the PIM via the backplane (not shown);

Inbound MUX gets the PCM data via the PCM/timing cable from the MPC;

TSI gets the PCM data via the backplane from the MUX;

Outbound MUX gets the PCM data via the backplane from the TSI;

Outbound MPC gets its PCM via the PCM/timing cable from the MUX;

Outbound PIM gets the PCM data via the backplane from the MPC;

DTI-32 gets the PCM data from the PIM via the PCM cable and sends it out on an E1 span to the network.

Similarly, the hardware architecture of the DTI-to-DCC data path (i.e., PCM path) is as follows from the DTI end device to the DCC end device (which is nearly the same as the DCC-to-DTI PCM path):

DTI's E1 span receives PCM data from the network;

Inbound PIM is connected to the DTI cards via a PCM cable;

Inbound MPC gets the PCM data from the PIM via the backplane (not shown);

Inbound MUX gets the PCM data via the PCM/timing cable from the MPC;

TSI gets the PCM data via the backplane from the MUX;

Outbound MUX gets the PCM data via the backplane from the TSI;

Outbound MPC gets its PCM via the PCM/timing cable from the MUX;

Outbound PIM gets the PCM data via the backplane from the MPC;

DCC gets its PCM data via the PCM/timing cable from the PIM.

Figure 3C:
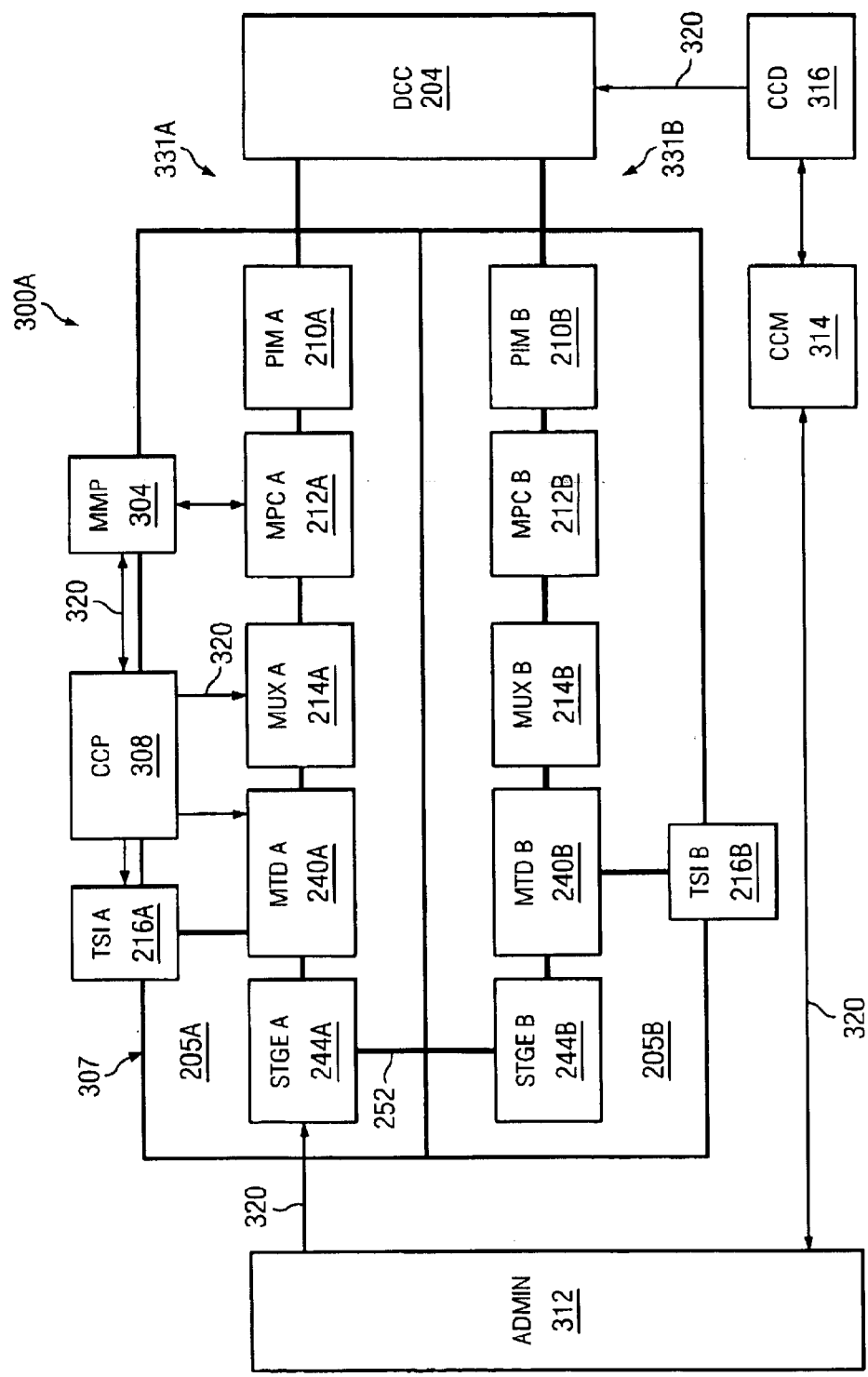

FIGS. 3B and 3C depict functional block diagrams of the presently preferred exemplary STP node 300A wherein de-coupled timing paths are provided in the planar mode of operation in accordance with the teachings of the present invention. As pointed out hereinabove with reference to the conventional cross-coupled STP arrangements, the de-coupled timing paths are comprised of STG-to-DTI timing path portions (reference numerals 332A and 332B in FIG. 3B) and STG-to-DCC timing path portions (reference numerals 331A and 331B in FIG. 3C) in the planar STP arrangement of the present invention also. The hardware architecture in the STG-to-DTI timing path portions is as follows from the STGE to the DTI end device on either A-side (i.e, matrix plane 205A) or B-side (i.e, matrix plane 205A):

The STGE is preferably comprised of the following two logical devices: EXTSYN (not shown in FIG. 3B or 3C) which provides an external reference signal to the STGE to produce a network frequency level; and an on-board oscillator timing source, OSC (not shown in FIG. 3B or 3C), which provides the base clock timing source for the STP switch 300A;

A logical device called timing bus cable (TBUS) which represents the cable connecting the STGE to the MTD;

MTD gets its timing from the STGE via the TBUS cable;

MUX and MTD are disposed on the same backplane and the MUX gets its timing from the timing input on the backplane provided by the MTD;

MPC gets its timing from a PCM/timing cable from the MUX;

BTD gets its timing from a timing cable from the MPC.

The BTD pair provides timing to the backplane for up to six DTIs in a presently preferred embodiment;

DTIs obtain their timing from the backplane provided by the BTD pair.

In similar fashion, the hardware architecture in the STG-to-DCC timing path portions (reference numerals 331A and 331B in FIG. 3C) is as follows from the STGE to the DCC end device on either A-side or B-side:

The STGE comprises the EXTSYN and OSC devices for providing external reference and base clock timing, respectively, as described hereinabove;

TBUS provides the cable connection between the STGE to the MTD as in the STGE-DTI timing path portion;

MTD gets its timing from the STGE via the TBUS cable;

MUX and MTD are disposed on the same backplane and the MUX gets its timing from the timing input on the backplane provided by the MTD;

MPC gets its timing from a PCM/timing cable from the MUX

PIM gets its timing from the backplane provided by the same side MPC (i.e., no cross-coupling as in the conventional STP arrangements);

DCC obtains its timing from a PCM/timing cable from the PIM.

Based on the foregoing, it should be appreciated that in order to provide the planar mode of timing paths in the present invention, the following are effectuated:

STGE/OSC frame lock is disabled or not implemented;

No TBUS cross-connects between STGE and MTD are provided;

No frame lock between active MPC and standby MPC; and

No MPC-PIM cross-connects in the DCC timing path portions.

Further, those skilled in the art should recognize upon reference hereto that in the planar mode of the present invention, the end devices, i.e., DTIs and associated BTDs, and DCC devices, see timing and PCM from a single side, i.e., either the A-side (plane 205A) or the B-side (plane 205B) of the redundant matrix. Accordingly, if the BTD and associated DTIs are set to the A-side, the timing and revenue PCM data for the DTIs are taken from the A-side, not the B-side matrix devices. Consequently, single point failures in the STP switch 300A are isolated to one side or the other of the matrix and if such a single point failure occurs on one matrix side, the other side is error-free. Consequently, by providing the switching functionality in the end devices (rather than in the redundant matrix itself) and allowing them to switch from the failed side/plane to the error-free side/plane, the STP's switchover can be accomplished relatively quickly (i.e., before the network reacts to the failure in the STP node) such that the STP's link with the network continues to stay up.

As will be described in greater detail hereinbelow, the planarized redundant matrix of the present invention's STP switch is provided with a plurality of end-to-end test channel connections for monitoring the matrix planes for a variety of failures. These failures encompass any of the following: timing path failures, PCM data path failures (e.g., due to cabling failures, electronic component failures, backplane failures, or board failures), and device communication failures. Preferably, the DTI's firmware is provided with the capability to monitor the test channels and, if a test channel error is detected, the firmware preferably issues a stream of suitable idle signals on all DTI's channels to the network in order to suspend the revenue traffic between the STP node and the network such that the network does not adversely react to the STP's failure or its recovery. Further, by generating appropriate idle signaling to the network, the planar STP of the present invention avails itself of an increased time window within which a switchover may be effectuated without disrupting the link.

In a presently preferred exemplary embodiment of the present invention, the DTI's firmware can detect a failure on a test channel and begin transmitting the idle signals within 1 millisecond, well within the network reaction times of about 48–128 milliseconds in today's implementations. The DTI end devices preferably need valid timing from the BTD devices for issuing valid idle signaling towards the network.

Accordingly, if the BTD timing source fails for whatever reason, the BTD must switch its timing before the DTI can issue valid idle signals. Upon receipt of valid idle signaling from the node, the network (i.e, a node on the other side of the link) goes into a "hold" mode and consequently does not remove the links.

Preferably, the BTDs are provided with a rapid auto-switch capability wherein when the BTD auto-switch is armed and a timing failure is detected while operating on one of the matrix planes, the BTD automatically switches to the other plane. In a presently preferred exemplary embodiment, the auto-switching is accomplished in less than 125 microseconds. The LTP software detects the BTD switch and notifies matrix software to switch accordingly.

The failover switching in the planar STP node is effectuated in accordance with the teachings of the present invention at the non-duplexed end devices, i.e., at the DTIs and DCCs. Whereas two separate boards are needed to perform the switchover for the trunks (BTD boards for timing and DTI boards for the revenue PCM traffic), the DCC boards are responsible for the switchover of both PCM and timing with respect to the network links (e.g., SS7 links). The PCM switchover is accomplished by the DTIs and DCCs on a highway basis (i.e., on an E1 span basis). A single DTI card supports two E1 spans (each span having 32 channels which include 30 revenue channels and two test channels) and, accordingly, a single DTI card switches 64 channels. A single DCC card, on the other hand, supports 4 links and when a switch occurs at the DCC level, 4 channels are switched in a presently preferred exemplary embodiment. For trunk timing switchover, it is performed on a BTD basis. In the presently preferred exemplary embodiment, one BTD verifies timing and provides control to switch the timing for six DTI cards, all of which can see timing from either the A-side or the B-side. Since a single redundant LTP is responsible for managing six DTIs and one BTD, there is a switchover at each LTP as well.

As briefly pointed out in the foregoing, the link timing switchover is performed on a DCC card basis, i.e., the timing is obtained from either the A-side or B-side PIMs. Within the matrix, there is a switchover of all the revenue PCM traffic and timing from one side to the other, preferably effectuated by appropriate matrix software.

Accordingly, to effectuate an auto-switchover of the entire node based on a detected PCM or timing failure, it requires hardware (BTD timing auto-switchover), firmware (DTI's test channel monitoring and automatically injecting idle codes into all channels towards the network),and appropriate software for DCC's and matrix's PCM and timing, and for switching DTI's PCM. Matrix software is also responsible for terminating the idle signaling after the switchover. Further, matrix software coordinates the switchover and makes sure all devices are properly switched over.

Figure 4A:
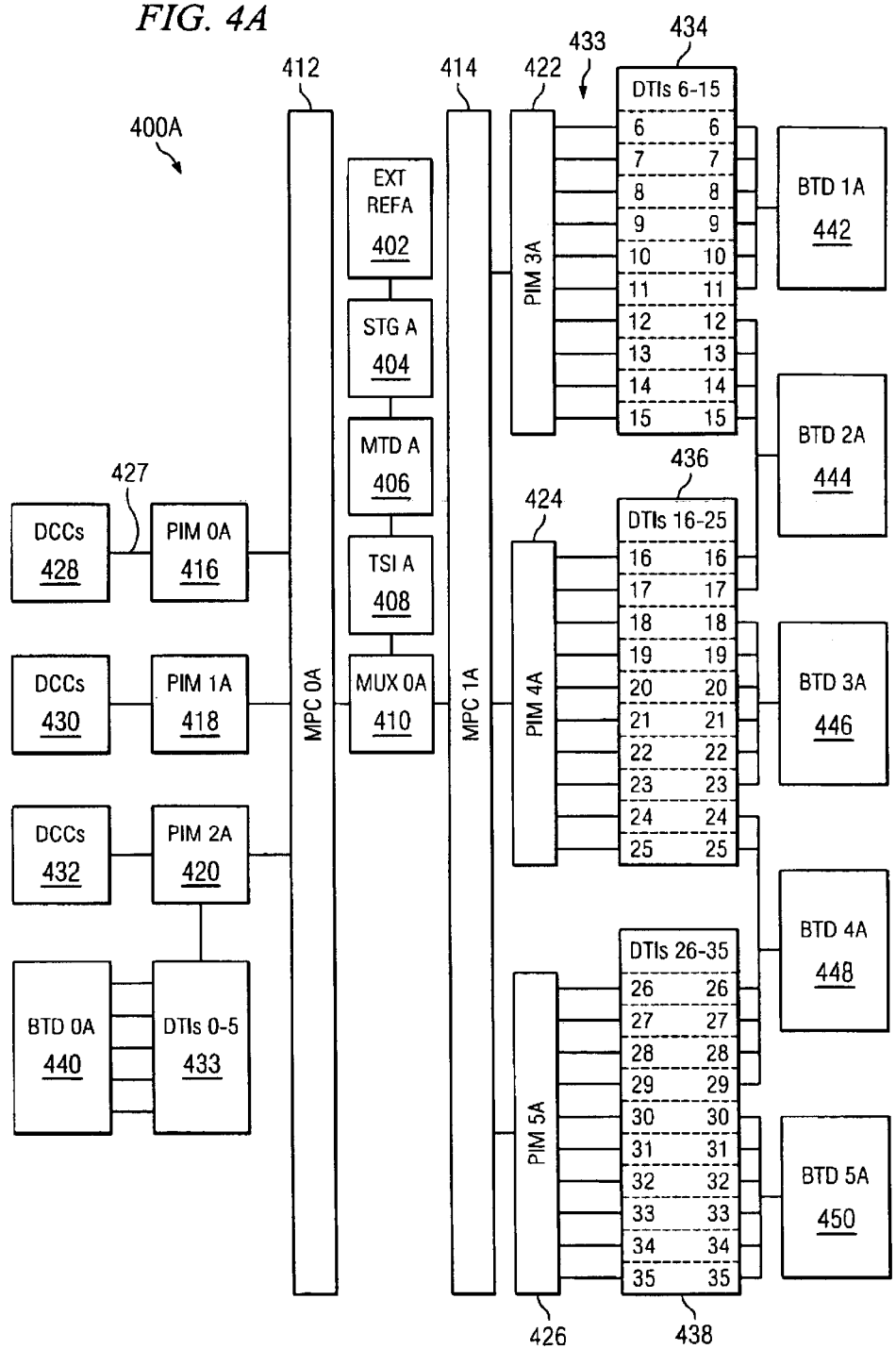
FIGS. 4A–4C depict three exemplary hardware configurations of the presently preferred embodiment of the planarized STP node.
Figures 1, 4B:
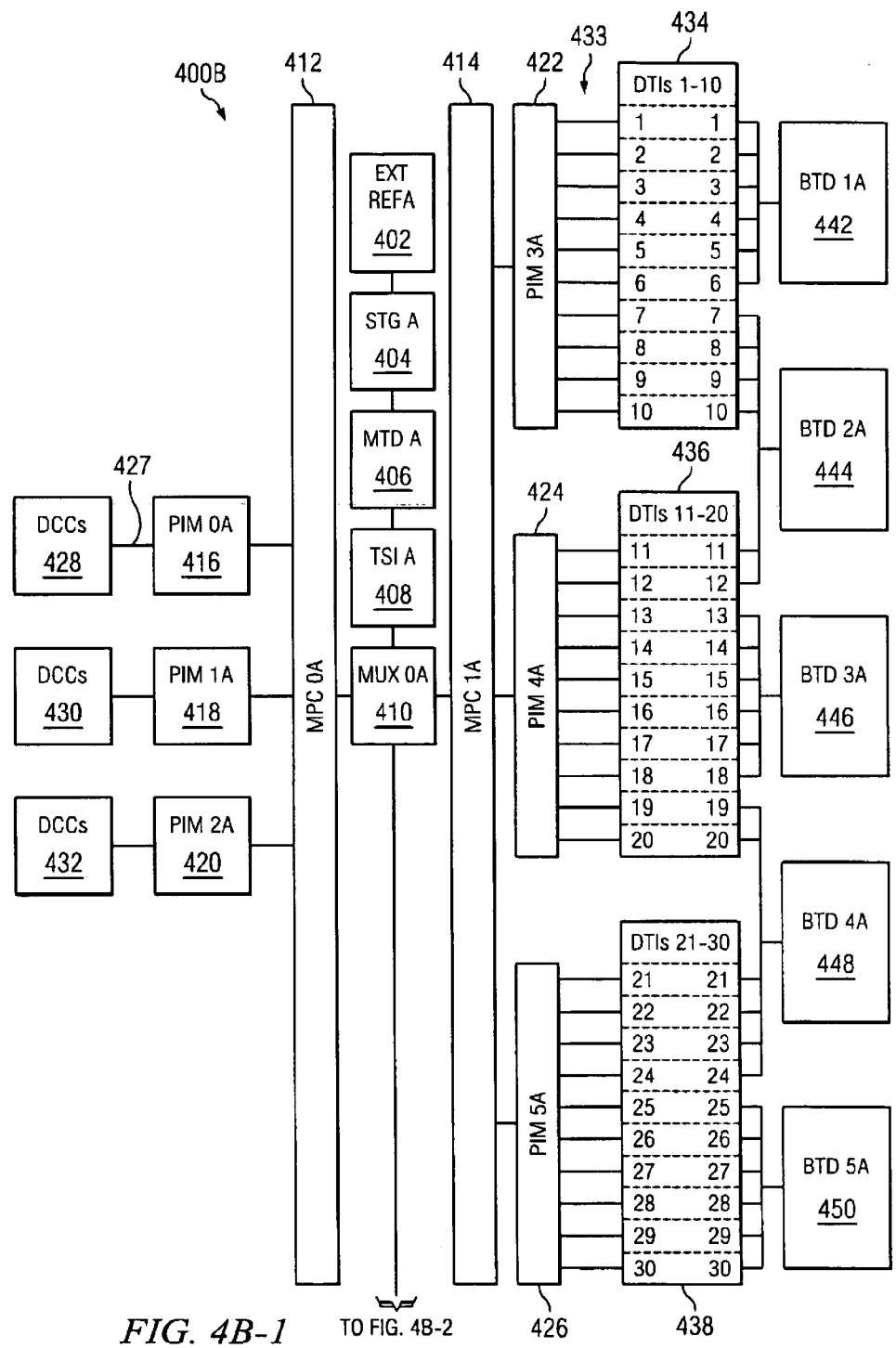
Figures 2, 4B:
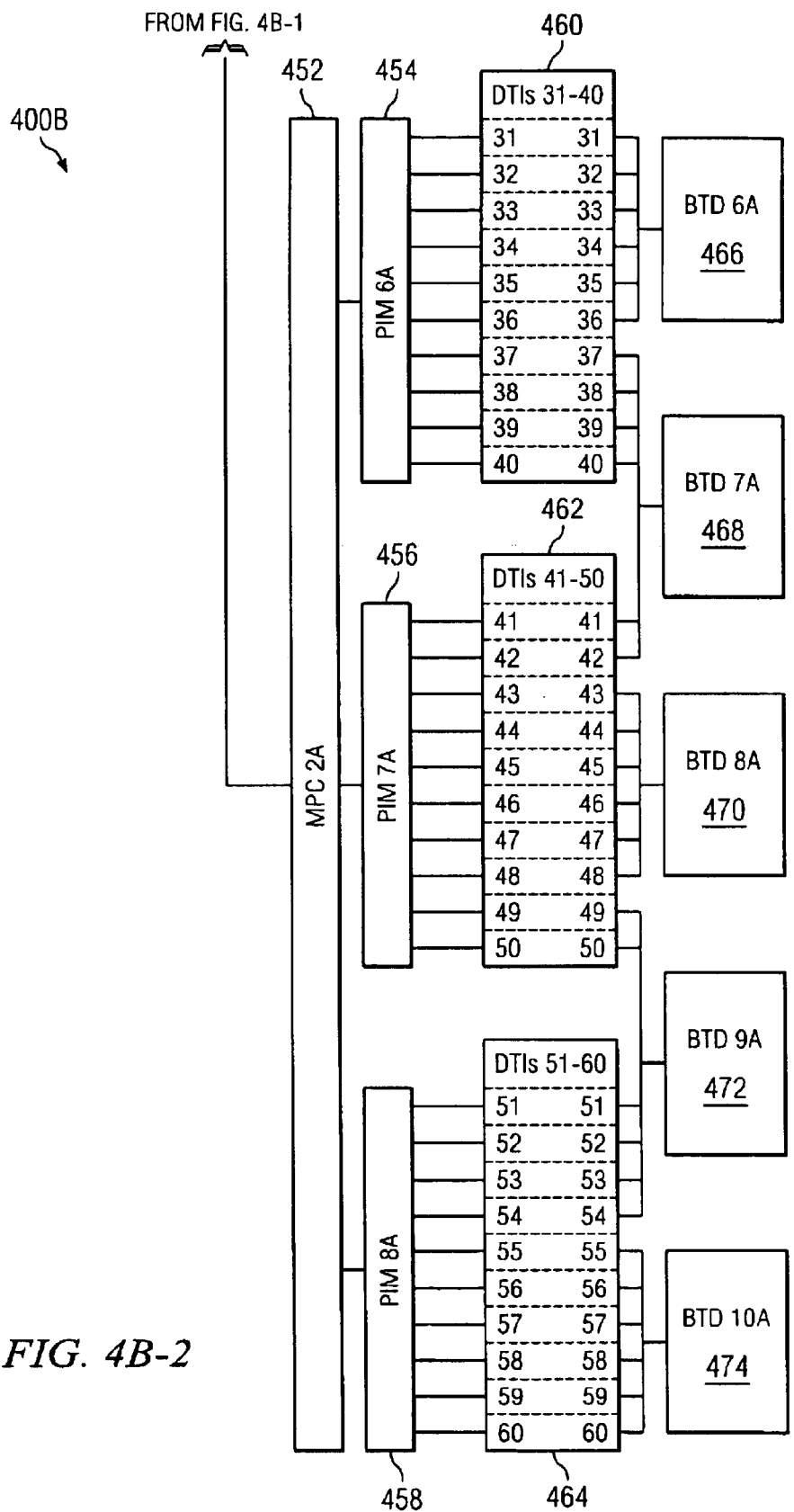
Figures 1, 4C:
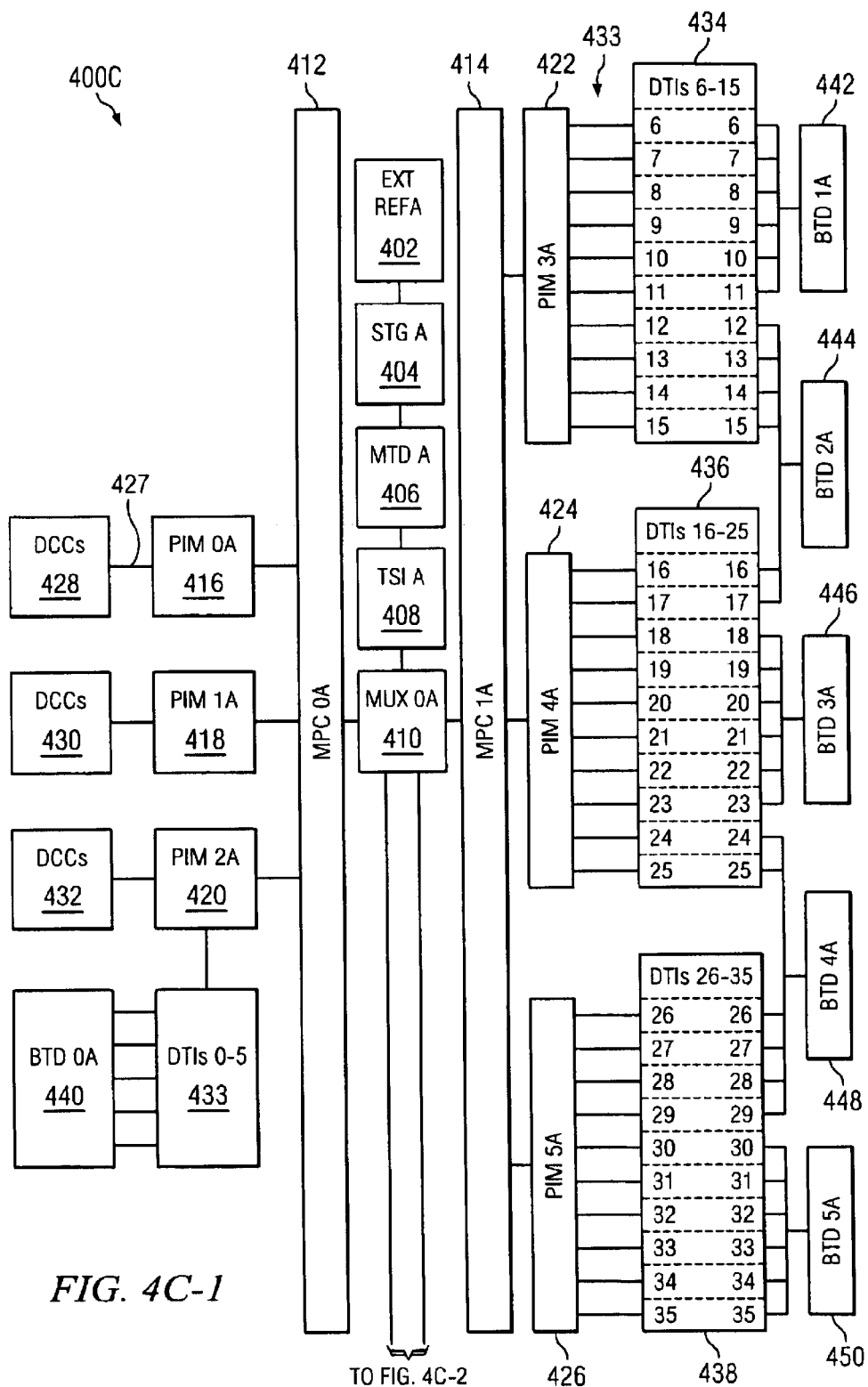
Figures 2, 4C:
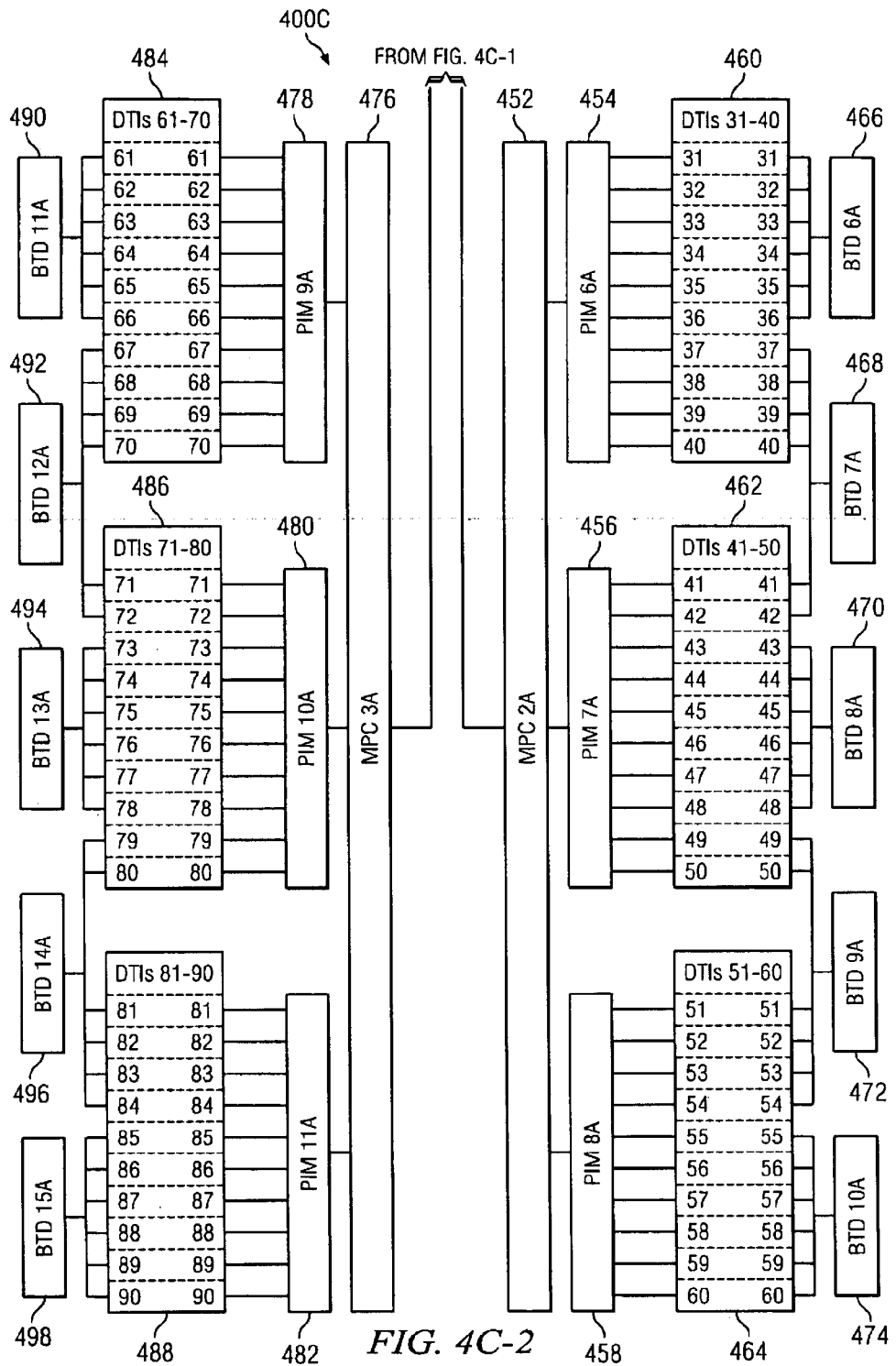

Referring now to FIGS. 4A–4C, depicted therein are three exemplary hardware configurations of the planar STP node wherein the teachings of the present invention may be advantageously practiced. For the sake of clarity, only one side (A-side) of the node is illustrated for each of the configurations.

As exemplified in configuration 400A (FIG. 4A), an external timing reference 402 is coupled to the A-side's STG 404. The MTD 406, TSI 408 and the MUX 410 form a portion of the A-side hardware as described in greater detail hereinabove. Two MPCs 412 and 414 are supported by the MUX 410 in this configuration. The MPC 412 supports three PIMs, reference numerals 416,418, and 420, respectively, each of which is provided with 20 revenue highways and a test highway for coupling with a bank of DCC cards. For example, DCC banks 428,430, and 432 are illustrated in this FIG. The DCC-PIM highways are collectively labeled with reference numeral 427 by way of example. Because six DTI cards (reference numeral 433) are also coupled to the PIM 420 (consuming 12 revenue highways), only eight highways are disposed between the PIM 420 and the DCC bank 432.

Three PIMs (reference numerals 422,424, and 426) are supported by the MPC 414. Each PIM is coupled to a bank of 10 DTI cards, via two revenue highways (e.g., reference numeral 433) for each DTI card. A test channel highway (not shown in this FIG.) is also disposed between each PIM and the corresponding DTI card bank. The entire ensemble of the DTI cards of the configuration 400A (36 of them) is supported by six BTDs (reference numerals 440, 442, 444, 446, 448, and 450), each BTD card supplying a valid timing reference to six DTI cards. A maximum of 768 SS7 links are supported in this configuration (8 DCCs/shelf×2 shelves/cluster×12 clusters×4 links/DCC).

In configuration 400B depicted in FIG. 4B, the functionality of the MUX 410 is expanded to support three MPC per side/plane. Accordingly, three MPCs, labeled with reference numerals 412,414, and 452, are exemplified in FIG. 4B. Sixty DTI cards are supported by the MPCs 414 and 452 in this configuration, which require 10 BTDs for timing. A maximum of 960 SS7 links are provided in the configuration 400B: 8 DCCs/shelf×2 shelves/cluster×15 clusters×4 links/DCC.

Configuration 400C depicted in FIG. 4C is similar to the configurations described above, with further expansion in the MUX 410 for supporting four MPCs, labeled with reference numerals 412, 414, 452, and 476. Ninety six DTI cards are supported by the MPCs, requiring 16 BTD cards in total for timing. A maximum of 1920 SS7 links are provided in the configuration 400C: 8 DCCs/shelf×2 shelves/cluster×30 clusters×4 links/DCC.

Figure 5:
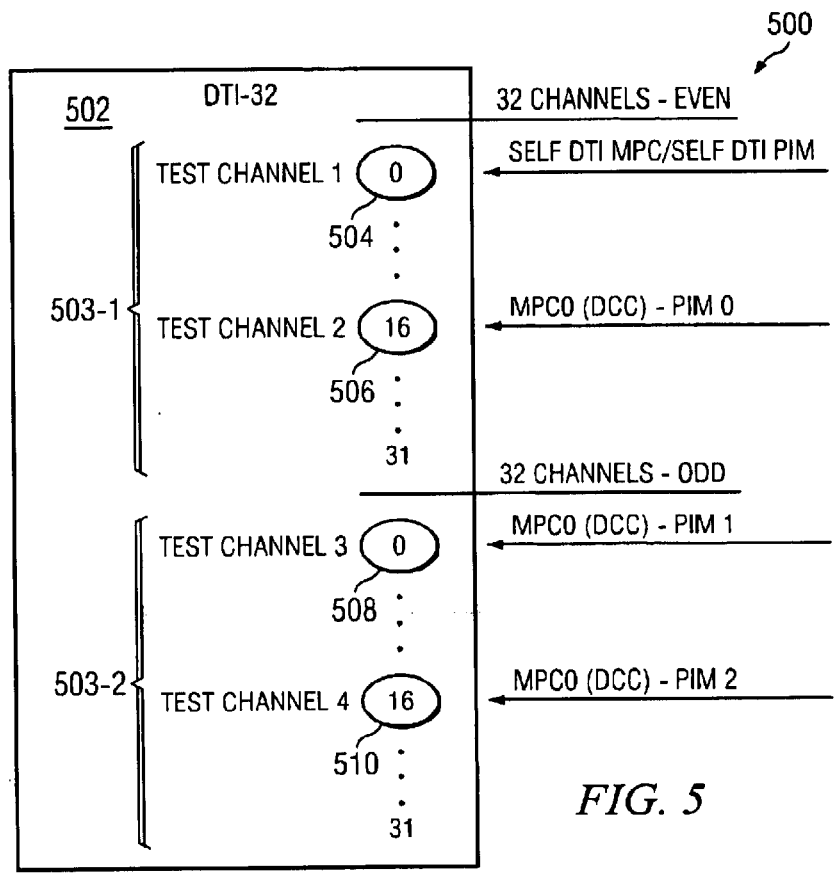
FIG. 5 depicts a test channel assignment scheme for the test channels available in each trunk-interfacing end device of the planarized STP node.

Referring now to FIG. 5, depicted therein is a presently preferred test channel assignment scheme 500 for each DTI card (e.g., card 502) disposed in the planar node of the present invention. As alluded to hereinbefore, two channels per E1 span are provided for propagating test patterns therethrough and, accordingly, four test channels are available on each DTI card (because of two E1 spans, an "even" span and an "odd" span"). One E1 span equals one highway (which comprises 32 channels) in the hardware configurations described hereinabove. Due to the way the DTI's highways are configured by the hardware, the first E1 span of a DTI card is designated as the even highway (reference numeral 503-1 ) and the second E1 span of the DTI card is designated as the odd highway (reference numeral 503-2). Also, by way of system configuration, channels 0 and 16 of each span are defined as test channels Accordingly, test channels 504 and 506 are exemplified for the even span 503-1 and test channels 508 and 510 are exemplified for the odd span 503-2.

Each of the test channels described above is provided as the terminating end of a matrix test channel connection. The originating end of the connection determines the matrix PCM path that the DTI's test channel monitors. Test channels 2–4 (reference numerals 506, 508, and 510) have originators from the DCC PIMs (which are SS7 link PIMs). Because the matrix test channel connections are preferably utilized for monitoring, the PCM that is monitoring the matrix plane by the DTI firmware (via the designated test channels) originates at the DCC PIMs, not the SS7 links. The matrix test channels with end connections in the DCC PIMs and DTI's are injected with a fixed pattern (preferably predetermined) by the PIMs, and it is this fixed pattern that the DTI's firmware monitors for when the test channel monitors associated with test channels 2–4 (reference numerals 506, 508, and 510) are enabled.

The originating ends for designated test channels 2–4 are the three DCC PIMs, e.g., PIM 416, PIM 418, and PIM 420 shown in FIGS. 4A–4C. Test channel 1 (reference numeral 504) is treated as a DTI self test channel wherein the originating end is the PIM under which the DTI is running. For example, for a DTI in the DTI bank 434 shown in FIG. 4B, PIM 422 would be the originator for that DTI's test channel 1. By way of hardware configuration, the last channel (i.e., channel 31) of the test highway disposed between the DTI bank 434 and the PIM 422 (not shown in FIG. 4B), which is designated as highway 20 (highways 0–19 being the revenue highways between the DTIs and the PIM), is used for sending the self test patterns.

Also, by hardware design in the presently preferred exemplary embodiment of the present invention, the originator channel for the DCC PIMs is provided as channel 31 of the test highway (i.e., highway 20) disposed between the DCC and PIM. As set forth above, such a highway was collectively referred to by path 427 between DCCs 428 and the PIM 416 (shown in, e.g., FIG. 4B).

The originating and terminating termini of the matrix test channel connections may be conveniently described by what may be referred to as "matrix appearances," which are comprised of four bytes, each being encoded for the following:

MPC pair number (0–63) (pair to account for A-side and B-side);
Subordinate PIM pair number (0–2);
PIM highway number (0–20);
Highway channel number (0–31).

By way of example, consider the DTI card running under MPC pair 1 (e.g., MPC 414 in FIG. 4A), PIM pair 4 (e.g., PIM 424 in FIG. 4A), and highways 14 and 15. The originating and terminating appearances for the four test channels of this DTI card are as follows:

TEST CHANNEL 1 [EVEN E1 SPAN, CHANNEL 0, DTI SELF PIM AS ORIGINATOR]
  Originator Appearance—MPC 1, PIM 4, HWY 20, CHN 31
  Terminator Appearance—MPC 1, PIM 4, HWY 14, CHN 0
TEST CHANNEL 2 [EVEN E1 SPAN, CHANNEL 16, MPC 0 AND
PIM 0 AS ORIGINATOR]
  Originator Appearance—MPC 0, PIM 0, HWY 20, CHN 31
  Terminator Appearance—MPC 1, PIM 4, HWY 14, CHN 16
TEST CHANNEL 3 [ODD E1 SPAN, CHANNEL 0, MPC 0 AND PIM 1 AS ORIGINATOR]
  Originator Appearance—MPC 0, PIM 1, HWY 20, CHN 31
  Terminator Appearance—MPC 1, PIM 4, HWY 15, CHN 0
TEST CHANNEL 4 [ODD E1 SPAN, CHANNEL 16, MPC 0 AND PIM 2 AS ORIGINATOR]
  Originator Appearance—MPC 0, PIM 2, HWY 20, CHN 31
  Terminator Appearance—MPC 1, PIM 4, HWY 15, CHN 16

Figure 6:
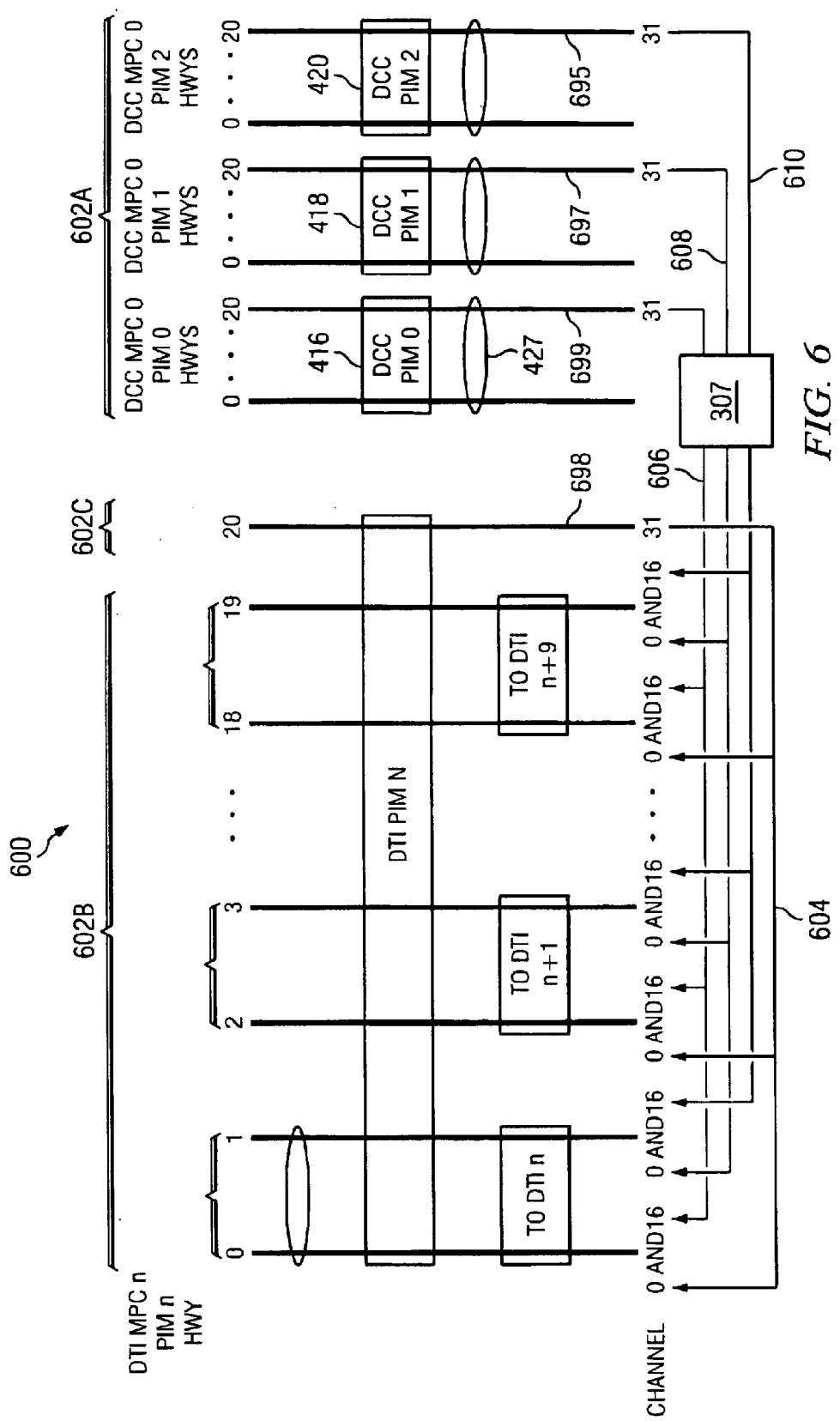
FIG. 6 depicts an exemplary layout of the end-to-end matrix test channel connections in the STP node for monitoring the integrity of de-coupled data and timing paths in accordance with the teachings of the present invention.

Thus, each DTI-32 is connected via the redundant matrix to a channel on DCC PIM 0, DCC PIM 1, DCC PIM 2, and one test channel connected to the PIM that the DTI-32 is connected to. Since there are only 3 DCC PIMs, this arrangement covers all possible connections between DTI-32 cards and DCC cards. In accordance with the teachings of the present invention, the DTI test channels are "nailed up," that is, permanent matrix connection between two circuits is established, when the matrix software is initialized or restored. FIG. 6 depicts an end-to-end matrix test channel connection layout in a presently preferred exemplary embodiment of the present invention. Four matrix test channel connections 604, 606, 608, and 610, one of which is a DTI self test channel (reference numeral 604), terminate at each DTI card of the planar node of the present invention. Three remaining connections have originator appearances (reference numeral 602A) in the DCC-based PIMs as described hereinabove and are terminated at DT cards via the matrix 307. HWY 20 (test highway), labeled with reference numeral 699, channel 31 is exemplified for PIM 416 (shown, for example, in a node organized as the configuration 400B in FIG. 4B). Similarly, HWY 20 (reference numeral 697), CHN 31 and HWY 20 (reference numeral 695), CHN 31 are exemplified as originator appearances for matrix test channel connections 608 and 610 respectively.

HWY 20 (reference numeral 698), CHN 31 is used for the originator appearance (reference numeral 602C) for the test channel 604 (self test channel) which terminates to CHN 0 of the even spans of each of the DTI cards. Test channel 606 terminates to CHN 16 of the even spans and test channels 608, 610 terminate to CHN 0 and CHN 16 of the odd spans of the DTI cards organized under the MPC-PIM hierarchical configuration, which provides the appropriate terminator appearances (reference numeral 602B) as set forth in greater detail hereinabove.

Figure 7A:
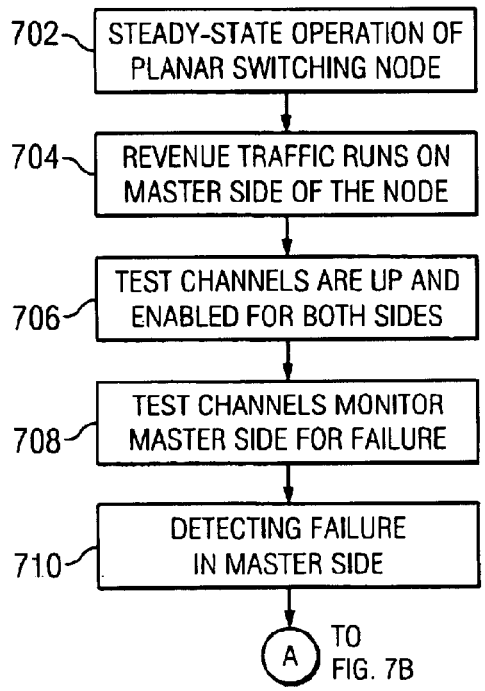
FIGS. 7A and 7B illustrate a flow chart of the steps involved in an exemplary embodiment of the link maintenance and matrix recovery method of the present invention.
Figure 7B:
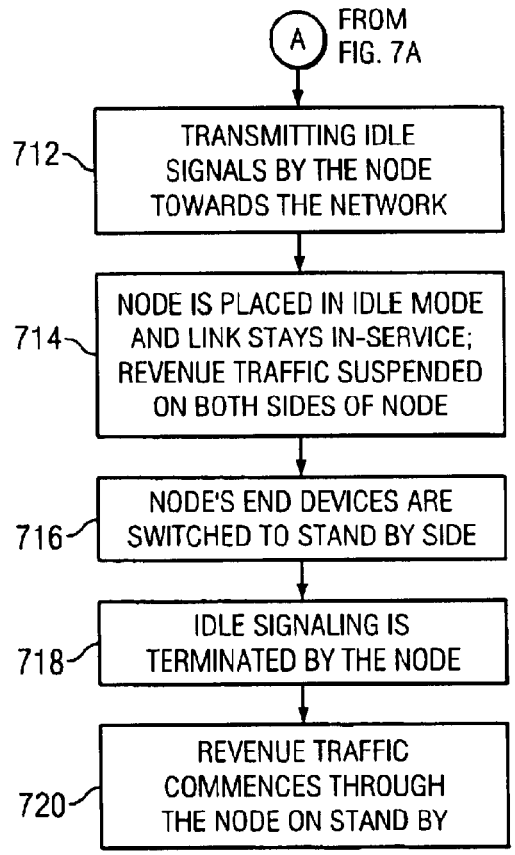

Referring now to FIGS. 7A and 7B, depicted therein is a flow chart of the steps involved in an exemplary embodiment of the link maintenance and matrix recovery method of the present invention. At steady-state operation of the planar switching node, the master side (A-side or B-side) runs the revenue traffic (steps 702 and 704). The end devices receive timing and PCM on the master side, which is initially set by the first PIM-PIM path (side) of an STP matrix plane that goes in-service. The STP matrix plane of the node, which comprises all the equipped matrix devices on both A- and B-sides and provides PIM-PIM PCM paths to the end devices, can either be in-service or out-of-service. When the STP matrix plane is in-service, the auto-switchover is enabled for the node. On the other hand, when any equipped matrix device goes out-of-service for whatever reason, the STP matrix plane also goes out-of-service and the auto-switchover is disabled at the end devices. Accordingly, the STP matrix plane is advantageously used as a mechanism for arming and disarming functions at the end devices.

In the steady-state, the matrix test channel connections are set up and enabled for both matrix sides (step 706). The test patterns are therefore monitored on the master side for failures (step 708). When a failure is detected in the master side (by the test channel monitors enabled in the DTI cards) (step 710), the DTIs emanate idle signals on all revenue channels towards the network (step 712) to idle the link and suspend traffic therethrough so that the network is prevented from taking the link down (step 714). Thereafter, the node's end devices are switched to the standby side (either A to B or B to A) which becomes the new master side (step 716). The node subsequently terminates the propagation of the idle codes to the network (step 718) and the revenue traffic commences through the standby (or, the new master side) side, as provided in step 720.

Figure 8:
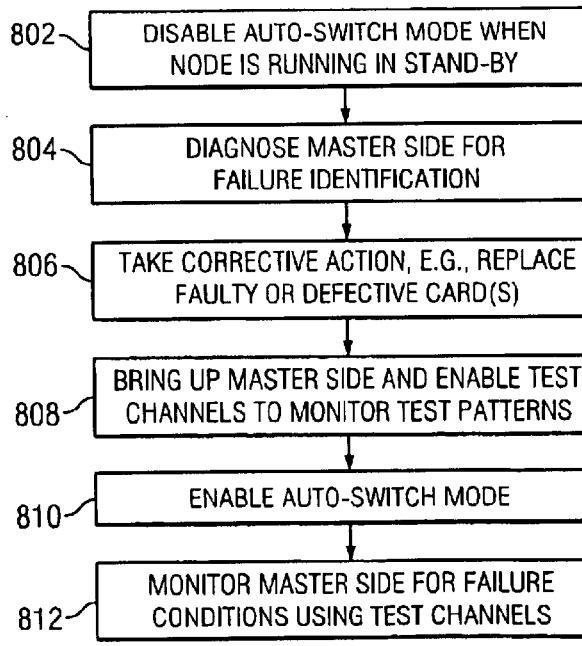
FIG. 8 depicts a flow chart of the steps involved in an exemplary auto-switching management operation of the link maintenance and matrix recovery method of the present invention.

As briefly mentioned above, the auto-switchover is disabled when the STP matrix plane goes out-of-service. To prevent switchover when the standby becomes the new master side (as provided in step 716 above), the STP matrix plane is rendered out-of-service because there is no good side to which the node should switch, should a failure be detected. FIG. 8 provides a flow chart of the steps involved in an exemplary auto-switchover management operation of the link maintenance method of the present invention. The auto-switchover mode is first disabled when the node runs on the standby side that has become the master side, by placing the node's STP matrix plane out-of-service (step 802). The former master side is diagnosed for failure identification (step 804) and appropriate corrective action (step 806). Thereafter, the former master side is brought up and the test channels therein are enabled for monitoring failures in test patterns (step 808). The STP matrix plane may now be placed in in-service mode so the auto-switchover is enabled for the end devices (step 810). Matrix master side is subsequently monitored for failure conditions (step 812).

The following operations are used by the matrix software to control and coordinate the end devices in switchover and switchover-related situations. In a failure situation, the matrix software ensures all the end devices are switched over. Further, the matrix software controls when the end devices can be enabled.

ARM [ENABLE SWITCHOVER CAPABILITY]
    For BTDs, this operation enables the auto-switch of timing. In DTI devices, firmware is enabled for monitoring of the designated test channels wherein the monitoring is performed on a per channel basis. The DCCs are enabled for software monitoring of timing by this operation, which also indicates whether switchover is allowed.

HARDWARE/FIRMWARE AUTO-SWITCH
    If the auto-switchover is enabled and a timing failure is detected, the BTD hardware switches to the other side in less than about 125 microseconds. A hardware register bit is set for subsequent software-based operations. If the test channel monitoring is enabled in a DTI device and a PCM failure is detected on one of the four designated test channels, the firmware puts out idle codes on all 60 revenue channels towards the network. A firmware flag is set for the software operations. In the presently preferred exemplary embodiment of the present invention, the DCC devices are not provided with auto hardware/firmware switching capability.

SOFTWARE AUTO-SWITCH
    After a hardware auto-switch by the BTD device, the LTP software sees the status error register and indicates the failure to matrix software for the STP matrix plane to be removed. The matrix software then causes PCM highways of the associated six DTI cards to switch their PCM. In the DTI devices, after the firmware detects a PCM failure and puts out idle codes, the LTP software sees the firmware flag and causes the BTD timing associated with the LTP to switch its timing. When the DCC detects a timing failure, if switchover is allowed (i.e., the associated STP matrix plane is in-service), the DCC switches both the PCM and timing.

DISARM
    By this operation, the auto-switchover capability is disabled in the BTDs. In DTIs, firmware monitoring of the designated test channels is disabled. The software switchover is not allowed in the DCCs when this operation is executed.

SWITCH
    In BTDs, the auto-switchover capability is disabled and the timing therefor is switched to the other side (from A to B, or B to A). The firmware monitoring of the test channels in the DTIs is disabled on a per-channel basis, and the two PCM highways of the card are switched to the other side of the matrix. Again, the software switchover is not allowed in the DCCs when this operation is executed.

IDLE CODES ON
    This operation is applicable to DTIs only. When executed, the DTI card transmits appropriate idle codes towards the network on all 60 revenue channels (30 per span).

IDLE CODES OFF
    This operation in DTIs stops the transmission of the idle codes on all revenue channels.

A typical sequence of operations for link maintenance and matrix recovery upon failure may be provided as follows:

Arm: Set for normal operation of the node. When all the matrix devices are in service, i.e., the STP matrix plane is enabled, the matrix software sets end devices for normal operation of the node.

Auto Hardware/Firmware Switch: A failure occurs, and switching is effectuated and the matrix software is informed of the switch.

Auto Software Switch: After the hardware/firmware switching, the end device software causes a switch to the other side. Any DTI that switched accordingly executes an Idle ON. Matrix software is informed of the switch.

Switch: For any devices that did not auto-switch, matrix software causes a switch to the new side. Any DTI that switched, executes an Idle ON.

Idle ON: Execute this operation for any devices that did not auto-switch.

Idle OFF: After all the end devices are switched, matrix software causes the DTIs to turn off the idle codes. Matrix software now has the STP matrix plane as disabled.

Based upon the foregoing Detailed Description, it should be apparent that the present invention provides an advantageous solution for maintaining a communications link between the network and a node even in the event of detecting a failure and recovering from it. By using a planarized matrix in accordance herewith, the single point failures are detected and, consequently, a rapid switchover sequence can be initiated in the node. Those skilled in the art should recognize that because the switchover process is moved to the edges (i.e., end devices) rather than within the matrix, a faster switchover is effectuated in the practice of the present invention.

It is believed that the operation and construction of the present invention will be apparent from the foregoing Detailed Description. While the method and apparatus shown and described have been characterized as being preferred, it should be understood that various changes and modifications could be made therein without departing from the scope of the present invention as set forth in the following claims. For example, although an SS7 node with E1 transmission links is particularly exemplified herein, the teachings of the present invention may be advantageously practiced with equipment operating on different protocols or standards relating to such as, e.g., signaling, transmission, bandwidth, etc. Further, the specific matrix appearances and matrix test channel connection layouts for the terminator and originator ends should be deemed illustrative rather than restrictive. It should be realized by those skilled in the art that a number of variations in test channel designations may be had depending upon the protocol used and hardware design. Furthermore, although specific matrix devices (e.g., PIMs, MPCs, TSIs, etc.) have been described in the exemplary embodiments, the teachings of the present invention are not restricted to architectures using these devices only. Rather, any planar mode redundant matrix architecture may used for practicing the present invention. Accordingly, all these modifications, permutations, combinations, additions, substitutions, et cetera should be considered to be within the ambit of the present invention whose scope is limited solely by the claims set forth hereinbelow.

What is claimed is:

1. A communications node disposed in a telecommunications network, comprising:
 a redundant matrix organized in a planar mode having a first side and a second side, wherein data and timing paths of said first side are de-coupled from data and timing paths of said second side, each of said first and second sides of said redundant matrix includes at least one external timing reference coupled to a system timing generator (STG), a matrix timing distributor (MTD) coupled to said STG, a time slot interchange (TSI) means coupled to said MTD, a multiplexer (MUX) coupled to said TSI means, at least one matrix port controller (MPC) coupled to said MUX, and a plurality of path integrity monitors (PIMs) coupled to each of said MPCs, wherein a first portion of PIMs are associated with said at least one DCC device and a second portion of PIMs are associated with said at least one DTI-E1 device;
 at least one trunk-interfacing end device for interfacing with said telecommunications network via a communications link, wherein said at least one trunk-interfacing end device is coupled to said redundant matrix at a first terminus said at least one trunk-interfacing end device including a Digital Trunk Interface (DTI)-E1 card;
 at least one channel-controller end device coupled to said redundant matrix at a second terminus, said at least one channel-controller end device including a DS1 Channel Controller (DCC) device; and
 a plurality of end-to-end test channels operably coupled between said at least one trunk-interfacing end device and said at least one channel-controller end device, said end-to-end test channels for monitoring a failure condition associated with at least one of said first and second sides of said redundant matrix.

2. The communications node disposed in a telecommunications network as set forth in claim 1, wherein said communications link comprises a Signaling System No. 7 (SS7) link.

3. The communications node disposed in a telecommunications network as set forth in claim 2, wherein said SS7 communication link operates at an E1 transmission rate.

4. The communications node disposed in a telecommunications network as set forth in claim 1, wherein said failure condition associated with said first side comprises a data path failure condition.

5. The communications node disposed in a telecommunications network as set forth in claim 1, wherein said failure condition associated with said first side comprises a timing path failure condition.

6. The communications node disposed in a telecommunications network as set forth in claim 1, wherein said failure condition associated with said first side comprises a device communication failure condition.

7. The communications node disposed in a telecommunications network as set forth in claim 1, wherein said failure condition associated with said second side comprises a data path failure condition.

8. The communications node disposed in a telecommunications network as set forth in claim 1, wherein said failure condition associated with said second side comprises a timing path failure condition.

9. The communications node disposed in a telecommunications network as set forth in claim 1, wherein said failure condition associated with said second side comprises a device communication failure condition.

10. The communications node disposed in a telecommunications network as set forth in claim 1, wherein each of said first and second sides of said redundant matrix further comprises a plurality of bus terminator devices (BTDs).

11. The communications node disposed in a telecommunications network as set forth in claim 10, wherein revenue traffic between said communications node and said telecommunications network switches from said first side to said second side of said redundant matrix upon encountering said failure condition detected by said DTI-E1 device using said end-to-end test channels in said first side.

12. The communications node disposed in a telecommunications network as set forth in claim 10, wherein revenue traffic between said communications node and said telecommunications network switches from said second side to said first side of said redundant matrix upon encountering said failure condition detected by said DTI-E1 device using said end-to-end test channels in said second side.

13. A signaling node disposed in a Signaling System No. 7 (SS7) network for switching between a plurality of SS7 links, comprising:
 a planar redundant matrix with a master side and a standby side, said master side having its data and timing paths de-coupled from data and timing paths of said standby side, wherein revenue traffic between said signaling node and said SS7 network runs on said master side encoded in a pulse code modulation (PCM) form;
 a plurality of Digital Trunk Interface (DTI) devices disposed on a first terminus of said planar redundant matrix for interfacing with said SS7 network;
 a plurality of bus terminator devices (BTDs) coupled to said DTI devices for selecting appropriate timing for said DTI devices;
 a plurality of DSI Channel Controller (DCC) devices disposed on a second terminus of said planar redundant matrix for effectuating protocol conversion between said PCM-encoded revenue traffic and SS7 messages;
 means for monitoring said master side for a failure condition associated with at least one of its data path, timing path and a device communication failure condition; and
 means for switching data and timing paths for said DTI DCC devices from said master side to said standby side when said failure condition is encountered in said master side.

14. The signaling node as set forth in claim 13, wherein said DTI devices operate at an E1 transmission rate.

15. The signaling node as set forth in claim 13, further comprising means for transmitting a plurality of idle signals towards said SS7 network when said failure condition is encountered in said master side.

16. The signaling node as set forth in claim 15, further comprising means for terminating said plurality of idle signals towards said SS7 network upon switching said data and timing paths for said DTI and DCC devices.

* * * * *